Jan. 17, 1956 J. D. CHRISTIAN 2,731,241

HEAT EXCHANGE DEVICE

Filed Sept. 7, 1955 11 Sheets-Sheet 1

INVENTOR.
Joseph D. Christian
BY
Robert H. Eennoff
ATTORNEY

Jan. 17, 1956 J. D. CHRISTIAN 2,731,241

HEAT EXCHANGE DEVICE

Filed Sept. 7, 1955 11 Sheets-Sheet 2

INVENTOR.
Joseph D. Christian
BY
[signature]
ATTORNEY

Jan. 17, 1956 J. D. CHRISTIAN 2,731,241

HEAT EXCHANGE DEVICE

Filed Sept. 7, 1955 11 Sheets-Sheet 3

INVENTOR.
Joseph D. Christian

BY Robert D. Sarnoff
ATTORNEY

Jan. 17, 1956 J. D. CHRISTIAN 2,731,241

HEAT EXCHANGE DEVICE

Filed Sept. 7, 1955 11 Sheets-Sheet 4

INVENTOR.
Joseph D. Christian
BY
Robert B. [signature]
ATTORNEY

Jan. 17, 1956 J. D. CHRISTIAN 2,731,241

HEAT EXCHANGE DEVICE

Filed Sept. 7, 1955 11 Sheets-Sheet 5

INVENTOR.
Joseph D. Christian

BY

[signature]
ATTORNEY

Jan. 17, 1956 J. D. CHRISTIAN 2,731,241
HEAT EXCHANGE DEVICE
Filed Sept. 7, 1955 11 Sheets-Sheet 6
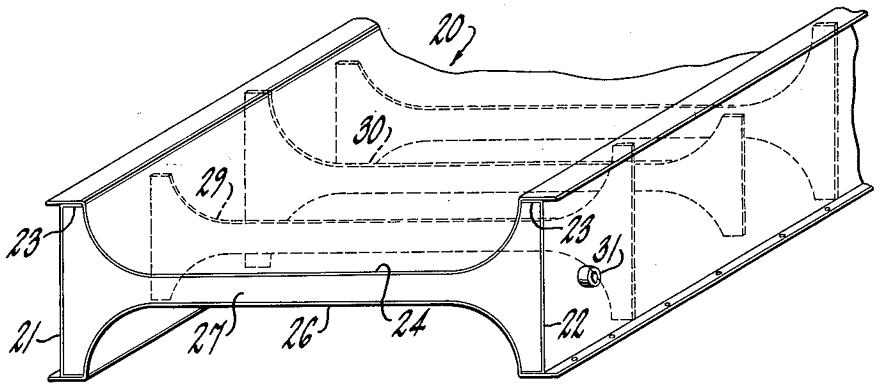
FIG. 11.
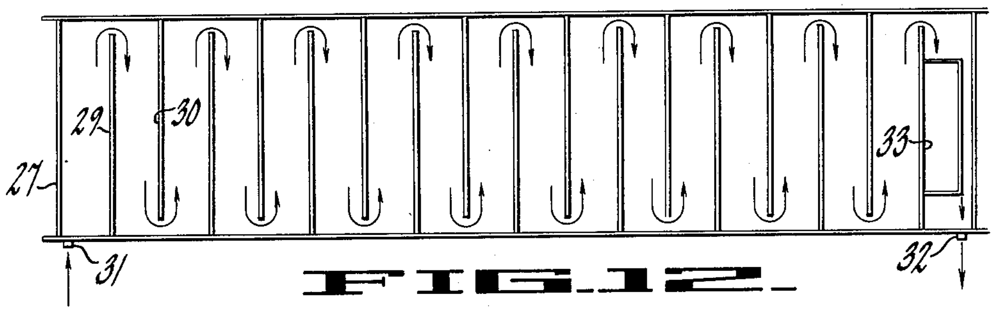
FIG. 12.
FIG. 14.
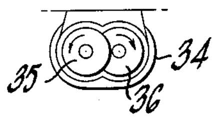
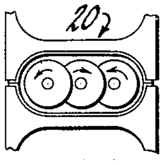
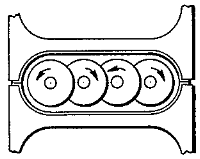
FIG. 13. FIG. 15.
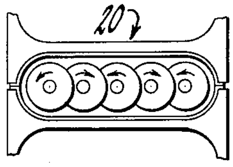
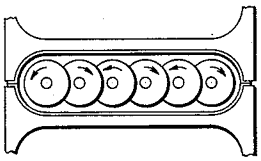
FIG. 17.
FIG. 16.
INVENTOR.
Joseph D. Christian
BY
Robert N. Bernoff
ATTORNEY INVENTOR.
JOSEPH D. CHRISTIAN
ECKHOFF & SLICK
ATTORNEYS
BY Robert S. Eckhoff
A MEMBER OF THE FIRM INVENTOR.
JOSEPH D. CHRISTIAN
BY ECKHOFF & SLICK
ATTORNEYS
BY [signature]
A MEMBER OF THE FIRM INVENTOR.
Joseph D. Christian

ECKHOFF & SLICK
ATTORNEYS

BY
A MEMBER OF THE FIRM

INVENTOR.
Joseph D. Christian
ECKHOFF & SLICK
ATTORNEYS
BY [signature]
A MEMBER OF THE FIRM INVENTOR.
Joseph D. Christian
ECKHOFF & SLICK
ATTORNEYS
BY [signature]
A MEMBER OF THE FIRM United States Patent Office 2,731,241

Patented Jan. 17, 1956

2,731,241

HEAT EXCHANGE DEVICE

Joseph D. Christian, San Francisco, Calif.

Application September 7, 1955, Serial No. 532,985

10 Claims. (Cl. 257—79)

This invention relates to an improvement in heat transfer and particularly to a device which is useful in the heating or cooling of fluids.

Although the heat exchange art is an old one, known devices and processes are not suited to many exchange problems. For example, a present process for the manufacture of common salt results in the salt issuing from the process at such an elevated temperature that the salt cannot be packed in paper bags because the paper will burn or char; a satisfactory cooler for hot salt crystals has never previously been developed. In the processing of fruits and vegetables of a quality such that the food is termed "baby foods," it is necessary to heat with meticulous uniformity to ensure that burning and scorching of the foods are completely absent. Heretofore, preparation of these foods has largely been carried on in a batch operation, each batch being separately handled. In the manufacture of large concrete structures such as dams, it is usual to cool the concrete in place by pipe through which a cooling medium is circulated; this has been necessary because the sand, pea gravel and cement used in the concrete could not be cooled.

In accordance with the present invention, I provide a novel heat exchange structure which is suited to the heating or cooling of any material which will flow to an extent whereat it can be moved through the apparatus. Thus, the apparatus can be successfully used for the cooling of salt, for the cooking or other processing of baby food, and for the cooling of materials such as sand, pea gravel and cement entering into the construction of concrete. The foregoing uses are suggestive only and are not set forth by way of limitation. However, they do illustrate the wide variety of uses to which the apparatus of the present invention can be successfully applied.

It is in general the broad object of the present invention to provide a new and novel heat exchange device.

A further object of the present invention is to provide a heat exchange device which can be successfully utilized to alter the temperature of a fluid, in some embodiments of the invention, and wherein the fluid is moved positively through the device in such fashion that abrasion or comminution of solid particles in the fluid passing through the device does not occur and particle size degradation is absent.

The device of the present invention contemplates a plurality of heat exchange screw conveyor flights arranged in such relation, one to the other, that each conveyor flight extends within the rotational path of the immediately-next-adjacent flight; the center spacing of any two adjacent and interengaged flights is less than half the sum of the diameters of the two flights; it is preferred that the flights be so arranged that the peripheral edge of one flight is substantially in a wiping contact with the hollow tubular shaft in the immediately-next-adjacent flight. Each flight includes a shaft supporting a helical conveyor flight which includes a leading face and a trailing face spaced from the leading face to provide a fluid conduit, a heat-exchange fluid being circulated through the tubular shaft and through the fluid conduit to provide a heat exchange with a fluid material in contact therewith. It is an additional object of the present invention to provide a novel heat exchange screw conveyor flight construction.

The aforementioned screw conveyor flights are supported for rotation within a tubular casing. In accordance with this invention, the casings are symmetrically disposed and are so arranged that they can be stacked, one upon the other, to provide any desired number of units, the construction of each casing being identical.

A further additional object of the present invention is to provide a novel casing construction for utilization in a device of the character described.

In accordance with this invention, a casing construction may be utilized which can be employed as a portion of the heat exchange apparatus, a fluid being circulated therethrough.

The invention includes other objects and features of advantage, some of which, together with the foregoing, will appear hereinafter wherein the present preferred form of device embodying this invention is disclosed. In the drawings accompanying and forming a part hereof:

Figure 11 is a perspective view with portions broken away showing the tubular casing utilized.

Figure 12 is a section taken through the heat exchange casing.

Figures 13–17 are each schematic views showing various arrangements of screws which can be utilized in accordance with the present invention.

In Figure 37, two threads are used per flight so that the lead is twice the pitch; in Figure 38, three threads per flight are shown, giving a lead of three times the pitch.

*The casing*

Figures 1, 2:
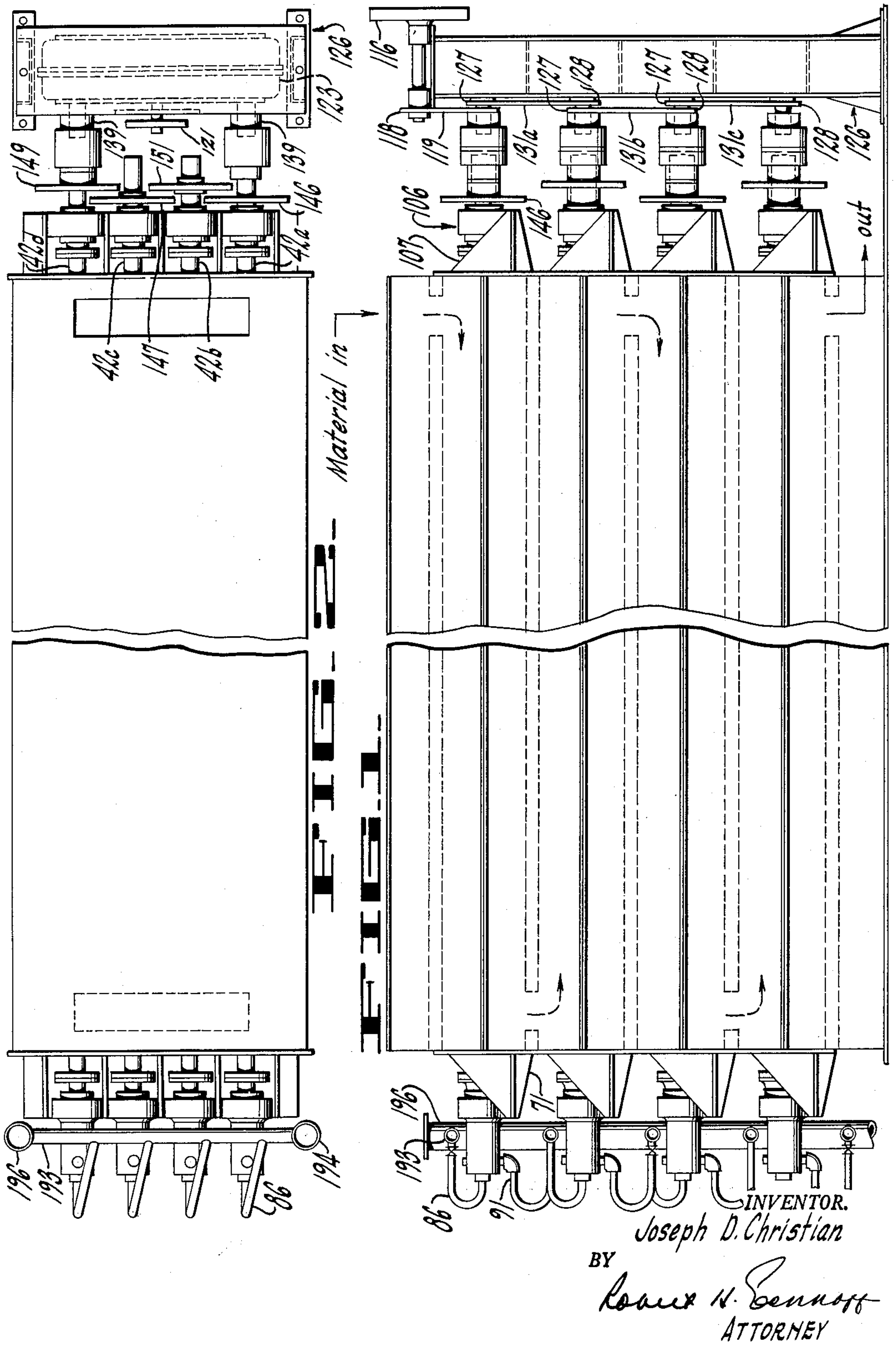
Figure 1 is a side elevation of a device embodying the present invention.
Figure 2 is a plan view of the device shown in Figure 1 with a portion of the drive mechanism omitted for clarity of illustration.

Referring particularly to Figures 11 and 12, I may employ a heat exchange casing unit 20 which comprises two opposite U-members 21 and 22, each having opposite parallel flanges or legs 23 thereon. An upper arcuately shaped cover plate 24 is provided to fit on the upper flanges 23 on each of the U-members 21 and 22 while, similarly, a lower cover plate 26 is provided to fit the lower flange 23. Plates 24 and 26 are each arcuate in cross-section, including a generally flat intermediate portion and opposite semi-circular sides to fit the outside screws which rotate within the unit, as will be presently described.

End closures 27 are mounted between the channels 21 and 22 and between the cover plates 24 and 26 at each end to form a tubular casing. A first plurality of transverse members 29 are provided, fitting between and being secured to the cover plates 24 and 26. Each of the first plurality of transverse members is secured at one end to channel 22 extending toward but being spaced at its other end from the channel 23, as appears in Figures 11 and 12. A second plurality of transverse members 30 are provided, these being attached to the cover plates 24 and 26 and, at one end, to channel 21, and having their other end spaced from channel 22. The first plurality of transverse members is arranged alternately with respect to one another, as appears in Figure 12, so that a heat exchange fluid, such as cooling water, steam, etc., introduced, for example, through fluid inlet 31, is forced to pass over a relatively long tortuous path to outlet 32, as is shown by the arrows in Figure 12. A duct 33 is provided at one end of the heat exchange unit casing to permit material resting on cover plate 24 to pass either to a lower unit or be withdrawn from the assembled units.

The casing described can be arranged in a vertical stack, the units being positioned one upon the other to provide the number of heat exchange units desired. Thus, as appears in Figures 1, 2 and 3, I have shown five of the described casing units 20 arranged one upon the other to provide four complete heat exchange units, the several units being similarly provided except that they are arranged alternately so that fluid material undergoing treatment and issuing from one unit must traverse the length of the next unit before it passes downwardly to the next lower unit and thus through the assembly, as many casing units 20 being arranged as is required to effect the desired overall heat exchange. The units are similarly fashioned so this operation is readily achieved merely by reversing the position of a unit with respect to each immediately adjacent unit. The several units are each of a width suited to the plurality of conveyor flights which are mounted for rotation in such units. The units are fitted to the outboard screws so that a minimum of dead material is present therein and so that a maximum of heat transfer surface is provided per unit volume of material. Thus, referring to Figure 13, note how the casing 34 fits the screws 35 and 36 and projects up away from the screws along a tangent taken at a point on an upper portion of the screw periphery to provide an open top, the sides of which are converging. When the unit is closed, as in Figures 3, 14–17, the surface area per unit volume of material is increased additionally.

In many instances, the cooling or heating provided by the flights themselves is sufficient, so that it is not necessary to employ a casing having passages for circulating a heat exchange fluid. Thus, a plain casing, such as shown in Figure 13, may be used; with abrasive materials such as soft sand, cement clinker and the like, the trough need not fit the screws closely, the effective working surface in the trough being provided by letting the material build up and provide its own working surface, as is well-known in the art.

*The screw conveyor flights*

Supported for rotation in the previously described heat exchange casing units 20 are a plurality of heat exchange screw conveyor flights generally indicated at 40. Two forms of circulation may be utilized, that shown in Figure 7 and that shown in Figure 8, the flights differing only in the arrangement provided for circulation of the fluid through the heat exchange conveyor flight, depending on whether concurrent or countercurrent flow of the material being treated and the heat exchange fluid is desired. In accordance wtih this invention, each flight includes a leading face 41 thereon, generally extending outwardly at an angle of substantially 90° to a shaft 42, which is preferably of hollow, tubular construction, upon which the leading face is provided. A trailing face 43 is provided in a spaced relation to the leading face and secured thereto to provide a conduit for flow of a heat exchange for the leading face. Preferably, one face extends outwardly beyond the outermost edge of the trailing face to provide a free peripheral edge. One can utilize various heat exchange fluid conduit constructions for cooling the faces of ther conveyor flight, including those shown in my Patent No. 2,321,185.

Figure 18:
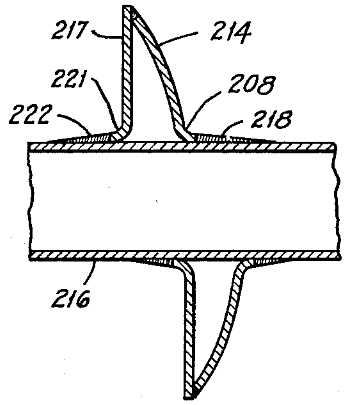
Figure 18 is a side elevation, partly in section, through a form of heat exchange screw conveyor flight.
Figure 21:
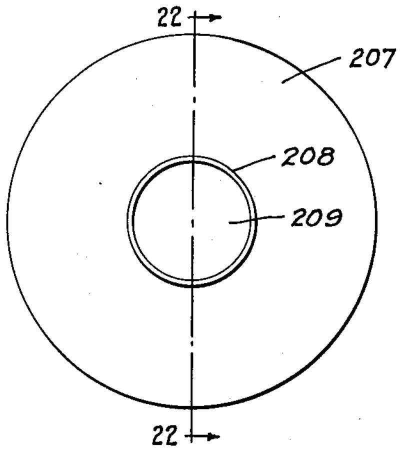
Figure 21 is a plan view of the disc shown in Figure 20 during a further step in the manufacture.
Figure 19:
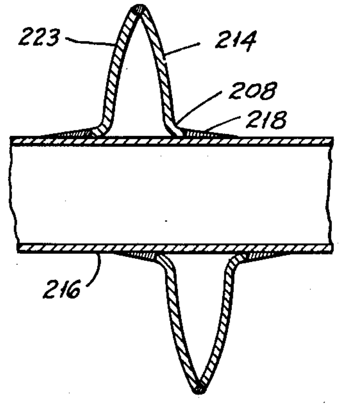
Figure 19 is a section through another form of heat exchange screw conveyor flight.
Figure 22:
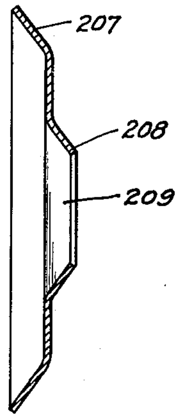
Figure 22 is a section taken through the disc shown in Figure 21 along the line 22—22 thereof.

The preferred flights are, however, shown in section in Figures 18 and 19 wherein, referring particularly to Figure 18, it will be noted that the structure shown includes a face 217, a major portion of which is substantially at 90° to the axis of the standard 216. It is also to be noted that face 217 is flared as at 221 to provide a portion extending along the run of the supporting shaft 216 and being secured by welding 22 which has been ground down to a fine tapered junction with the standard 216 and being secured by welding 222 which has been the complete flight to ensure absence of retention of the material handled and which enables the structure to be maintained clean. Faces 214 in Figures 18 and 19, and face 223 in Figure 19, are of the same arcuate form although the major, intermediate portion of each face is substantially flat while the whole of the face is at substantially 90° to the axis of the supporting standard 216. Faces 214 and 223 are flared as at 208 to extend along the standard 216 and are joined by welding 218 which is, in turn, ground down to a smooth taper junction with the standard 216.

Figure 20:
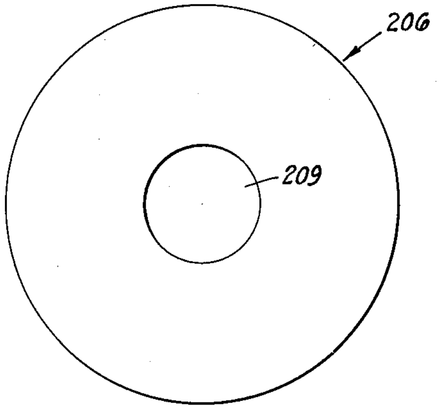
Figure 20 is a plan view of a disc from which a portion of a heat exchange screw conveyor flight can be formed.
Figure 23:
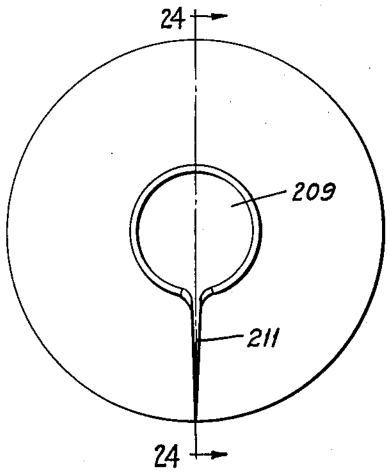
Figure 23 is a plan view of a disc in an advanced stage of its manufacture.
Figure 24:
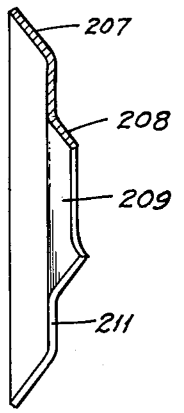
Figure 24 is a section taken along the line 24—24 in Figure 23.
Figure 26:
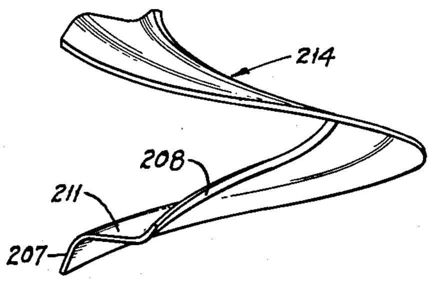
Figure 26 is a perspective view of the completed helical flight.
Figure 25:
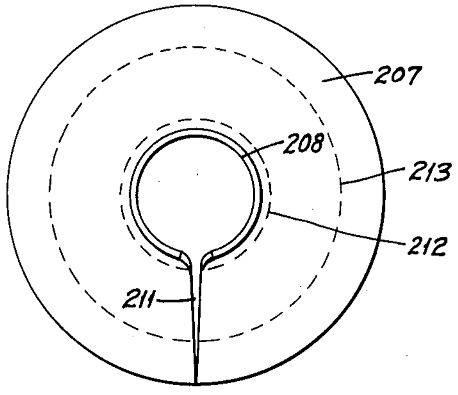
Figure 25 is a plan view of the disc shown in Figure 24, illustrating diagrammatically where the forming pressure is applied to the disc to form the helical flight.

The arcuate flight sections providing faces 214 and 223 are provided as follows: Referring particularly to Figure 20, a flat annulus is provided, being indicated at 206, and having a central aperture 209. This annulus is then subjected to a forming operation in a suitable die whereby the outer peripheral portion 207 and the inner peripheral portion 208 are flared outwardly but in opposite directions. The annulus is then cut, as is indicated in Figures 23 and 24, with a radial cut 211 extending from the aperture 209 to the periphery of the disc. The disc, then of the form in which it appears in Figure 25, is next subjected to formation in helical forming dies, but the helical deforming pressure is applied only to the intermediate portion between circles 212 and 213, as indicated in Figure 25, so that the outer peripheral flared portion 207 and the inner peripheral flared portion 208 are not disturbed except in that they take on the helical form. The radius of the aperture 209 is reduced in the forming operation, and the completed blank has overlapping ends; ordinarily, the blank of Figure 26 will represent more than a complete circle, e. g., 400°. The completed flight is generally indicated at 214 in Figure 26; when of suitable hand, the flight can be utilized to provide the arcuate conveyor illustrated in Figures 18 and 19. When two or more of the screw conveyor flights of the construction illustrated in Figure 18 are utilized, excellent agitation is secured in material subjected to heat transfer in contact with the flights; the heat transfer rate is improved, however, when two or more of the flights shown in Figure 19 are utilized with the screws interleaved, as will presently appear.

Figure 27:
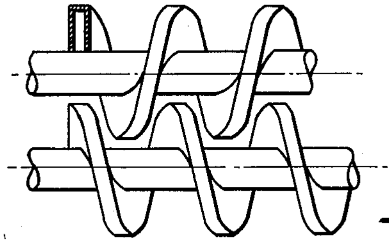
Figures 27 through 32 illustrate various forms of interfolded flights which may be employed.
Figure 33:
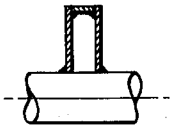
Figures 33 through 36 illustrate cross-sections of various flights which may be employed; these views are schematic and the spacing of each flight along its supporting shaft has been increased over that which is preferred to facilitate illustration.
Figure 34:
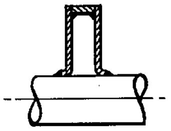
Figure 35:
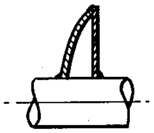
Figure 32:
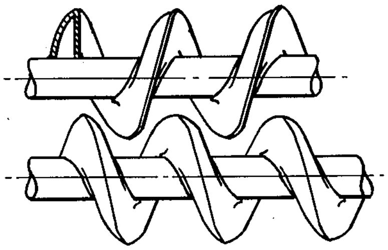
Figure 36:
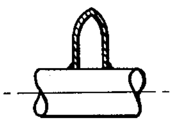

In Figures 18, 19 and 33 through 36, various cross-sections of screw conveyor flights are illustrated. Thus, the flights may have a single flat face and an arcuate face, such as is shown in Figures 18 and 35; two arcuate faces, as is shown in Figures 19 and 36; or two flat faces, as is shown in Figures 33 and 34. The flights may be joined to the shaft by straight side walls, as is illustrated in Figures 33, 35 and 36, or the flight may be flared at the point of junction, as is shown in Figures 18, 19 and 34. The flights may be intermeshed in various combinations, as is shown in Figures 27 through 32. Thus, one can work curved faces against curved faces, as is shown in Figure 29, flat faces against flat faces, as shown in Figure 27, or various combinations of flat faces and curved faces, as shown in Figures 28 and 30 through 32.

Figure 30:
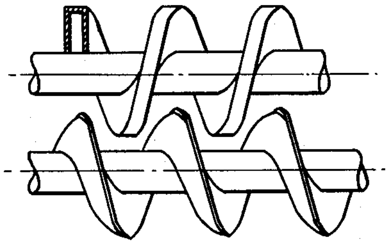
Figure 28:
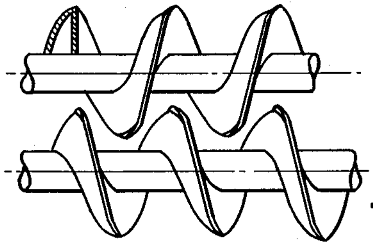
Figure 31:
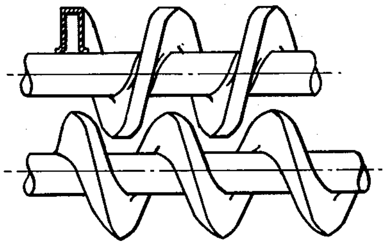
Figure 29:
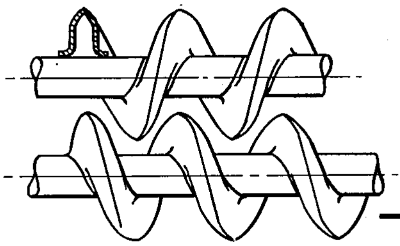

A particularly advantageous form of construction is that illustrated in Figure 28. In this, a flat face always works against a curved face. This gives a maximum of agitation and a minimum of comminution. In many applications, comminution is not undesirable, and may even be advantageous; in such applications, flights having flat sides and square shoulders, such as shown in Figures 27, 30 and 31, may be employed to advantage.

Any of the flights illustrated may be operated in either direction. In the case of those flights not having a symmetrical cross-section, such as those illustrated in Figures 18 and 35, different results will be obtained depending upon the direction of rotation. For example, if the device of Figure 28 is operated with the flat faces leading, the material will pass through the flight at a higher speed than if the curved faces are leading. One can thus construct a heat exchanger to give a high through-put or a long residence time, depending on the particular needs of a given job.

It will be apparent from the drawing that the center shaft serves primarily to support the flight and, in some instances, to act as one path for the heat exchange fluid. The area of the center shaft exposed to the material being treated is small compared to the area of the flight as a whole, so that the shaft contributes little to the heat exchange. Therefore, the center shaft should be as small as possible, consistent with strength requirements, or if it is used to convey the heat exchange fluid, consistent with the required fluid-flow capacity. Further, I have found that agitation is poor unless the shaft is relatively small compared to the diameter of the flight as a whole. Although the shaft can be of any desired cross-sectional shape, such as square, hexagonal, round or the like, it is preferred to use a round tubular shaft since this shape is the easiest to construct, provides a good strength to weight ratio, and provides an excellent fluid path. Of course, if the shaft is solid, it is necessary to provide glands at both ends of the flight for the introduction and withdrawal of the heat exchange fluid.

Figure 45:
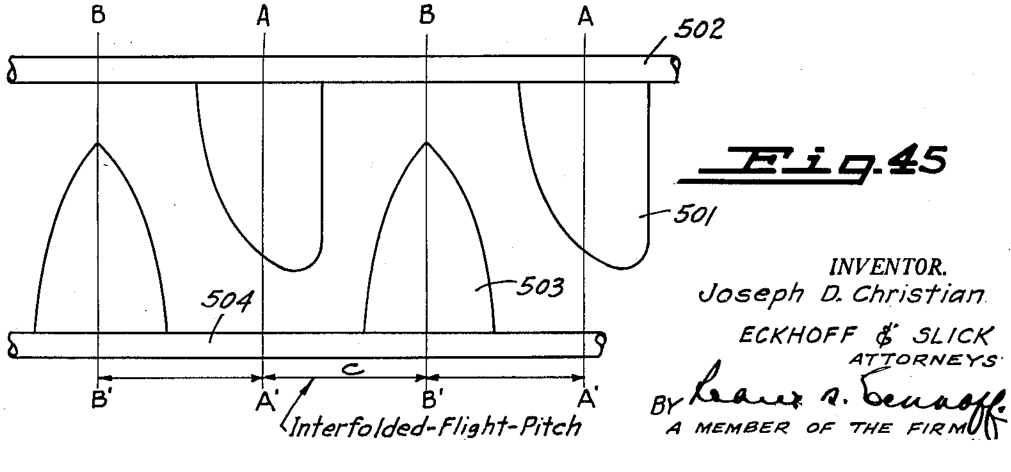
Figure 45 is a diagrammatic view illustrating the manner of determining the interfolded-flight-pitch.

Another important consideration is the thickness of the threads upon the flights. With very thin threads, little agitation is achieved, and material tends to pass through the heat transfer device in a relatively undisturbed condition, i. e., some portions of the material being treated are constantly in contact with the heat exchange surfaces, while other portions pass through with little or no contact. When thick threads are used, the volume of free space between the flights is much less than the volume on the opposite sides of the flight. Thus, the material is constantly being moved into an interstitial space having a relatively small volume and then allowed to move into an interstitial space having a relatively large volume; stated differently, the trailing face on one screw cooperates with the leading face on the other screw to provide during rotation of the screws a space of variable volume in relation to the trough and thus effect positive re-location of solid material in the fluid in contact with the faces upon rotation of the screws. The total free volume of the entire structure, of course, does not change as the screws are rotated, but the total free space, as measured instantly along a plane extending normal to the longitudinal axis of the screws, will shift in location, while the several areas making up the total free space, as measured instantaneously on the plane, will each vary in size as the screws are turned. This alteration leads to fluidization and agitation of the material and is necessary to achieve satisfactory results. With interfolded flights, the maximum thickness of the individual threads cannot be so great that no room is present for material and clearance between the threads is therefore provided. This clearance is selectively increased according to the material being processed but, in any event, the thickness of the thread at a point radially about halfway between the shaft and the periphery of the helix should not be less than 25% of the interfolded-flight-pitch. By interfolded-flight-pitch, I refer to the distance between a first plane passed through one flight normal to its supporting shaft at a point midway of the flight along the shaft and a second plane passed through an immediately adjacent interfolded flight normal to its supporting shaft at a point midway of that flight along its supporting shaft, the distance being measured substantially parallel to the axes of the flights. The meaning of this term will be further apparent upon considering the diagrammatic showing of Figure 45 in which plane A—A′ corresponds to the first plane passed through one flight, indicated at 501, and normal to the supporting shaft 502 for such first flight. A second plane B—B′ is passed through a second flight 503, this being immediately adjacent and interfolded with respect to the first flight 501; plane B—B′ passes through the supporting shaft 504 at a point midway of the flight 503 and normal to the supporting shaft for such flight. The distance C is measured between the planes A—A′ and B—B′ substantially parallel to the axes of the flights, as these are represented by shafts 502 and 504.

Figure 39:
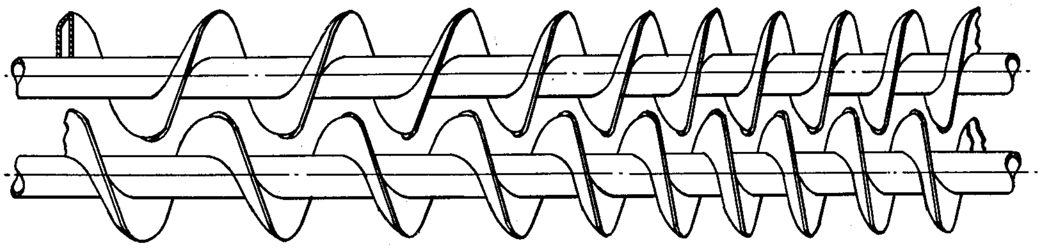
Figure 39 illustrates interfolded flights wherein the pitch varies along the flights.
Figure 40:
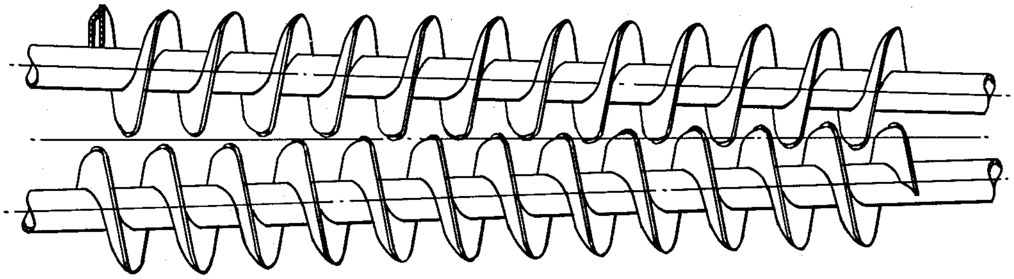
Figure 40 illustrates interfolded flights wherein the major axes of the flights are not parallel.

The shafts supporting the several flights in an interleaved relation are preferably arranged in a parallel relationship. However, if desired, the shafts can be arranged so that they are not parallel but converge or diverge at a small acute angle in the direction of material flow. Such a structure is illustrated in Figure 40. This construction is of utility in the handling of materials which change in volume, as the material is treated; for example, in drying wet fish meal, the bulk of the material reduces materially as the water is removed from the meal. It is therefore advantageous to have the flights not only interleaved, but to have the shafts supporting the flights at a slight acute angle to one another so that, in effect, they converge as the material reduces in bulk. Similarly, it is preferred that the flights be of uniform pitch throughout their length, but the pitch may be varied without departing from the spirit of the invention. Such a structure is illustrated in Figure 39.

Figure 37:
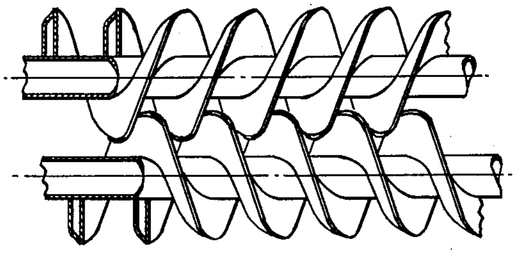
Figures 37 and 38 are illustrations of interfolded flights having more than one thread on each flight.
Figure 38:
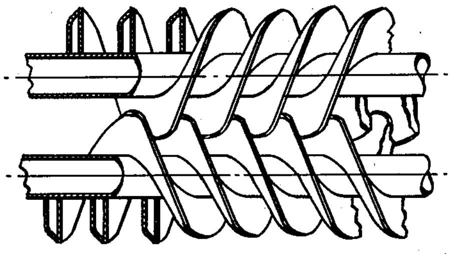

Although it is preferred that each flight have a single thread thereon, two, three or even more threads can be used on each flight. Thus, there is illustrated in Figure 37 flights having two threads, while in Figure 38 a structure is shown having three threads per flight. Such structures are particularly advantageous when one wishes to treat a large volume of material for a short time.

Figure 41:
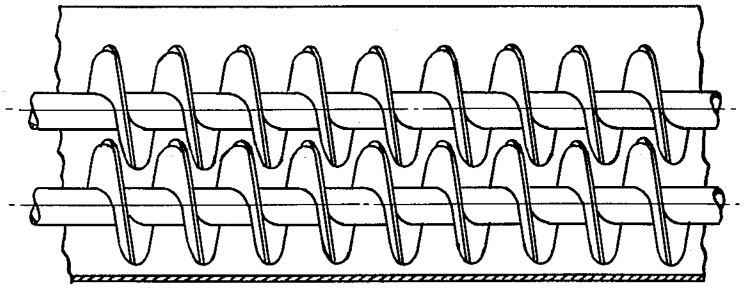
Figures 41 and 42 are front and side elevations, respectively, showing two interfolded flights placed one over the other.
Figure 42:
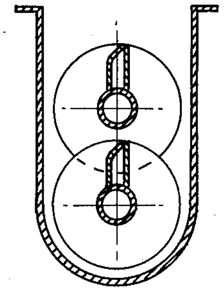
Figure 43:
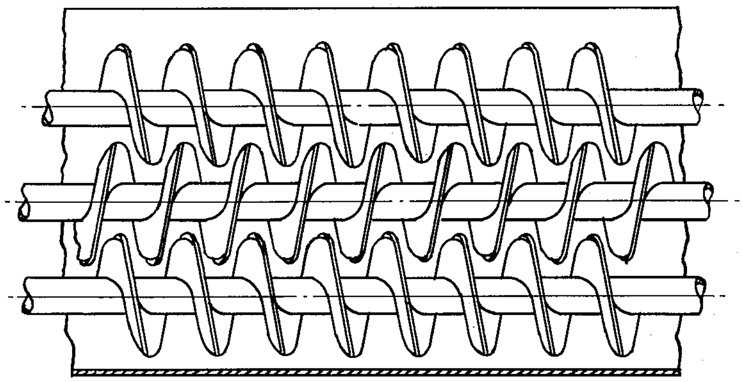
Figures 43 and 44 are similar to Figures 41 and 42 except that three flights are shown.
Figure 44:
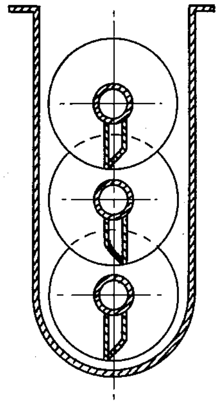

The flights ordinarily are located with the axes of adjacent flights on a horizontal plane. However, it is often advantageous to support one flight over another, so that the axes are on a vertical plane, or at an angle between vertical and horizontal. Thus, in Figures 41 and 42, interfolded flights of the same hand are illustrated, one above the other. In Figures 43 and 44, three screws, alternately right and left hand, are shown. Where screws of opposite hand are used, closer pitch is possible than where screws of the same hand are interfolded. Thus, greater heat exchange area is available in the same cubic measurements and there is a higher ratio of heat exchange area to material volume, resulting in a thinner average layer thickness of material.

Only one screw in any assembly has circumferential clearance and that is the bottom screw. Sometimes close circumferential clearances are extremely important and are expensive to make and maintain. All screws above the bottom screw can have relatively large clearances between the circumference of the screw and vertical walls without any deleterious effect on the material or the processing of the material. This results in material cost savings.

The casing, constructed as a simple U, is very much cheaper to make and there are no dead spaces between the screws where material would lay on a flat bottom and not be uniformly processed.

Each tubular shaft 42 includes a closure or seal 44 at one end 45 thereof. A concentric tubular insert 46 is provided at the other end of the shaft and is supported by annular discs 47 and 48, the tubular shaft being in fluid communication with the interior of the tubular insert beyond the disc 47. Fluid passages 49 and 51 are provided between the tubular shaft and the fluid conduit at each end of the screw conveyor flight, while passages 32 are provided in disc 48 at the other end of the shaft 42.

Figure 7:
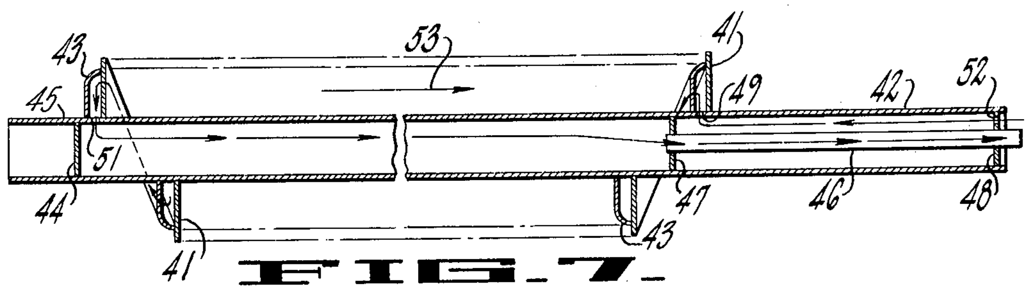
Figures 7 and 8 are side elevations, partly in section, showing the fluid circulation through two forms of hollow screw conveyor flights, the views being somewhat schematic.

In that form of flight shown in Figure 7, a heat exchange fluid is introduced into the end of shaft 42 and through passages 52 and thence between the tubular insert and the tubular shaft, through passage 49 into the screw conveyor flight to pass therethrough and issue through passage 51 into the tubular shaft and thence out through the tubular insert 46. This type of construction may be utilized, for example, when the flow of fluid material is from left to right in Figure 7, as is indicated by the arrow 53. When the flow of material is from right to left, as indicated by arrow 54 in Figure 8, the flow of fluid is reversed, the fluid entering through the tubular insert 46 and passing through the tubular shaft to enter into the fluid conduit on the screw conveyor flight through passage 51, issuing from the screw conveyor flight through passage 49 and thence passing through the space between the tubular shaft and the tubular insert 46 to issue through the passages 52.

Depending on the nature of the operation to be performed, the screws are selected from the forms described so that the fluid material passes in a desired direction with respect to the flow of heat exchange fluid in the screw conveyor flight.

*Shaft support*

Figure 6:
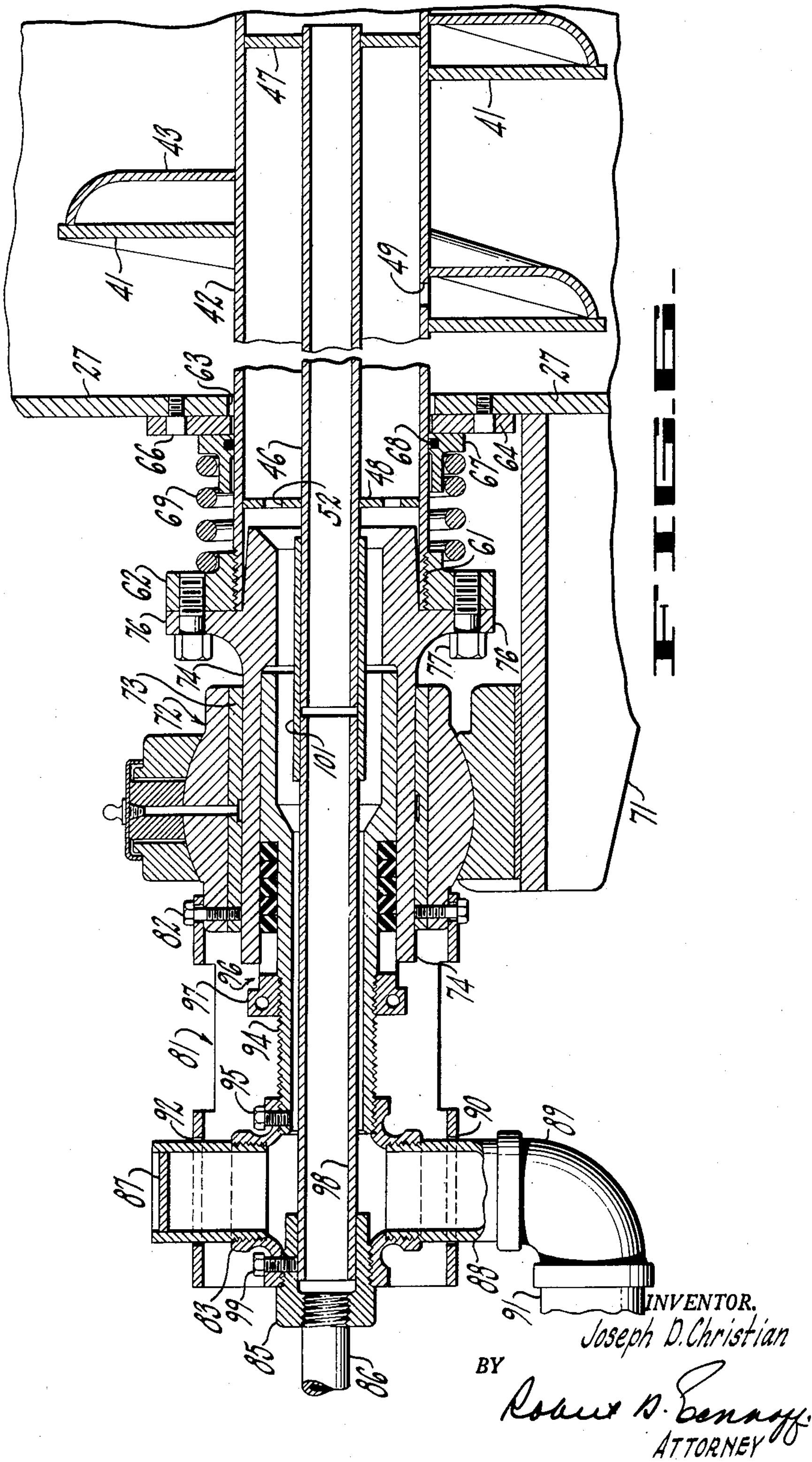
Figure 6 is a side elevation partly in section, showing the support for a conveyor shaft and the connections for admission and withdrawal of fluid from the hollow screw conveyor flight.

To support the heat exchange fluid end of each screw conveyor flight shaft 42, I preferably utilize the support structure shown in Figure 6. The end of shaft 42 is provided with a thread as at 61 and a flange 62 is screwed on to the end of the shaft. The shaft projects through an aperture 63 in the casing unit end closure 27, a plate 64 being secured over this aperture by studs 66. An annular sealing member 67 is slidably mounted upon the shaft 42 and includes a seal 68 engaged with the shaft. A spring 69, extended between the flange 62 and sealing member 67, forces the sealing member into engagement with the plate 66 to seal shaft 42.

A bracket 71 is mounted upon the end closure 27, the bracket carrying a bearing structure generally indicated at 72. The bearing structure includes a bearing 73 supporting a tubular shaft 74, the latter having a flange 76 at one end thereof secured by studs 77 to the flange 62 on shaft 42. This construction supports shaft 42 for rotation, making accurate machining of shaft 42 unnecessary and enabling a new bearing surface to be provided by substituting a new tubular shaft 74.

A tubular extension 81 is mounted upon the bearing 72 structure as by studs 82. A four-way cross pipe fitting 83 is mounted within the tubular extension and includes a tubular plug 85 on one side thereof having a pipe connection 86. Another side of the cross is closed by a plug 87, while a third side carries a bushing 88 therein and to which is connected an elbow 89 and a pipe 91 through which fluid is admitted or withdrawn; the bushing 88 extends through an opening 90 in one side of the tubular extension 81 while plug 87 extends through another opening 92. At its fourth side, the cross 83 carries a threaded tubular extension 94 secured in place by a set screw 95. The tubular extension extends forwardly in a sliding fit with the interior of the tubular shaft 74, a packing gland, generally indicated at 96, being mounted between the two and including a gland-nut 97 mounted on the threaded portion of the member 94. A pipe 98 extends through the cross and is secured thereto by set screw 99; the pipe 98 includes a tubular extension 101 fitting in a sliding fit over tubular insert 46 which projects from the screw conveyor shaft 42.

Figure 8:
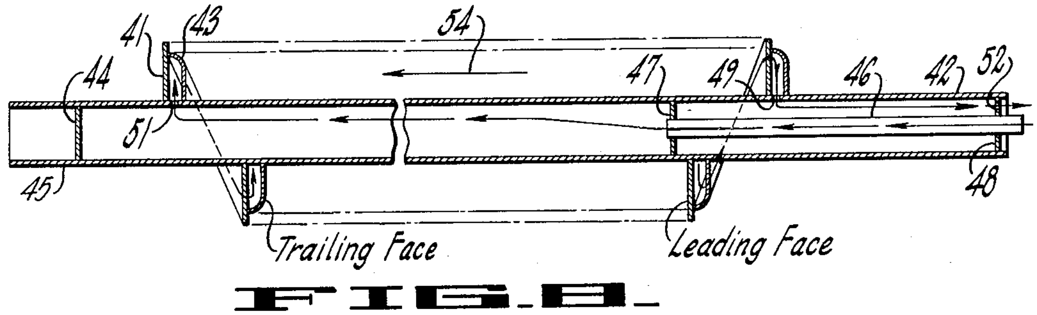

Fluid to be admitted or withdrawn to the interior of the screw conveyor flight, as has been described in connection with Figures 7 and 8, is admitted or withdrawn through pipes 86 and 91, fluid to the interior of shaft 42 passing about the exterior of pipe 98 and through the interior of tubular shaft 74 and extension 94 to pipe 91, while fluid to the interior of tubular insert 46 passes through flexible extension 101 and pipe 98 to pipe 86.

The opposite end 45 of each shaft 42 is supported for rotation in a bearing structure generally indicated at 106 and mounted on a bracket 107 on an end closure 27.

*The drive*

To drive the several conveyor flights in each exchange unit in a desired relationship any suitable drive means can be employed. That particularly disclosed in Figures 1, 2, 4, 9 and 10 will be described.

Figure 3:
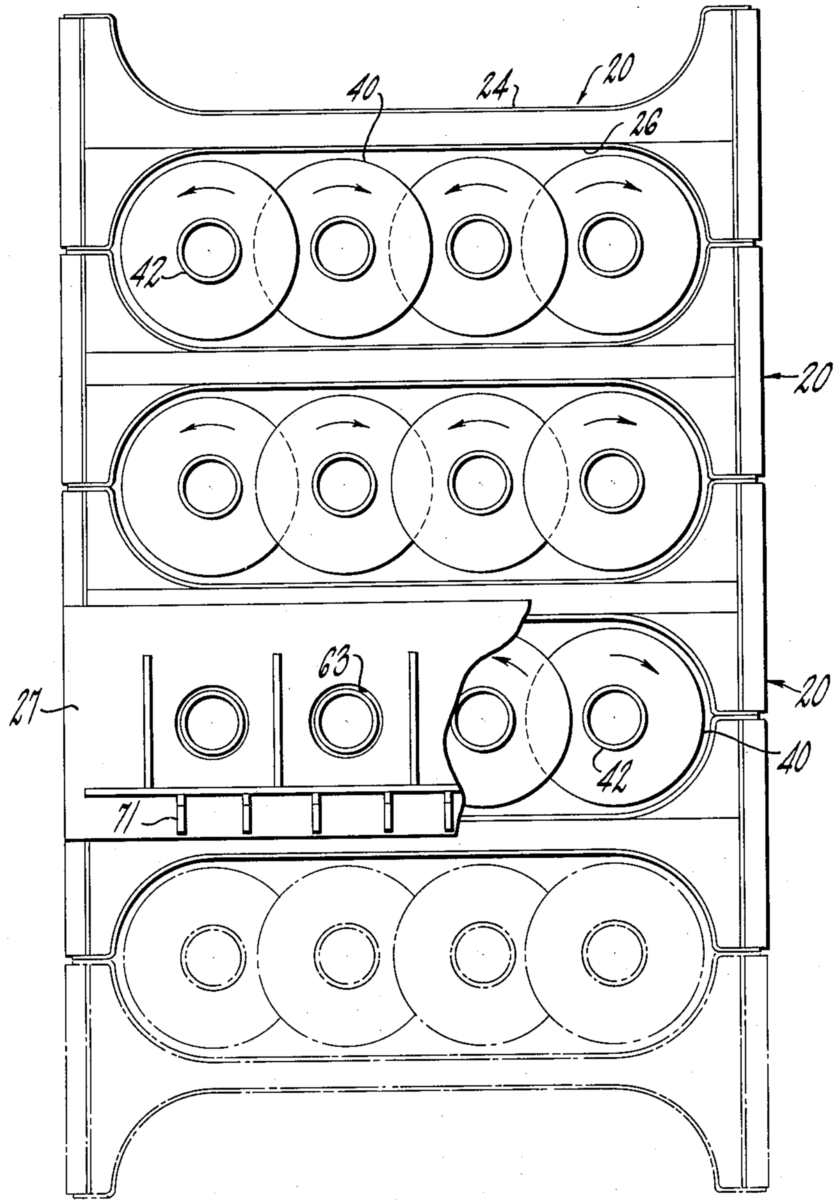
Figure 3 is a front view showing certain details of construction and the arrangement of the screw conveyor flights, portions of the apparatus being omitted for convenience in illustration.
Figure 4:
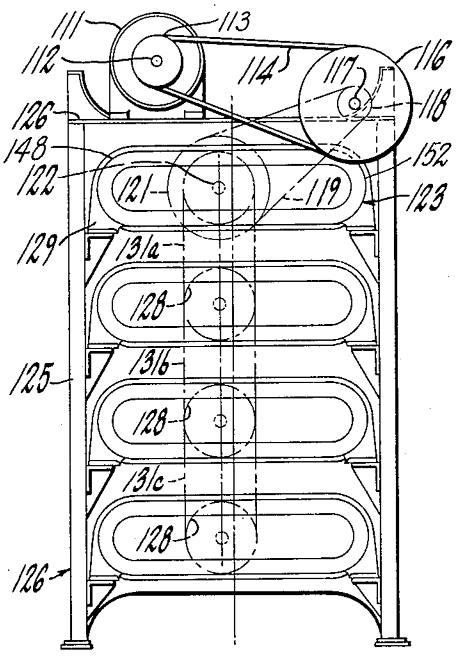
Figure 4 is a front elevation with a schematic showing of the drive arrangement.

Referring particularly to Figure 4, a prime mover, generally indicated at 111, is mounted upon the top of an auxiliary frame, generally indicated at 126, and including vertical side members 125 mounted upon a suitable foundation. The prime mover includes a drive shaft 112 having a V-belt pulley 113 thereon, a plurality of V-belts 114 being trained about this pulley and about a pulley 116 upon a counter-shaft 117 suitably supported for rotation. A sprocket 118 is mounted upon the shaft 117 and chain 119 is passed about this sprocket and about a sprocket 121 on a drive shaft 122 mounted for rotation in a drive unit generally indicated at 123 (Figures 2, 3 and 4), which will be presently described. A drive unit 123 is provided for each of the heat exchange units and is the device shown in Figures 1 and 4, four heat exchange units are shown, four drive units being provided.

Each drive unit 123 includes side brackets or feet 129 thereon, the drive units being extended between the vertical side members 125, being secured to the brackets 129 by suitable bolts (not shown) extended through feet 129 on each drive unit. Except for the uppermost and lowermost units, each drive unit includes a pair of sprockets 127 and 128 on its input shaft 122; the uppermost unit includes only sprocket 127 and the chain 131*a* is trained about sprocket 128 of the second unit. Similarly, chain 131*b* is trained about sprocket 127 of the second unit and sprocket 128 in the third unit, while chain 131*c* is trained about sprocket 127 of the third unit and sprocket 128 of the fourth unit.

Figure 10:
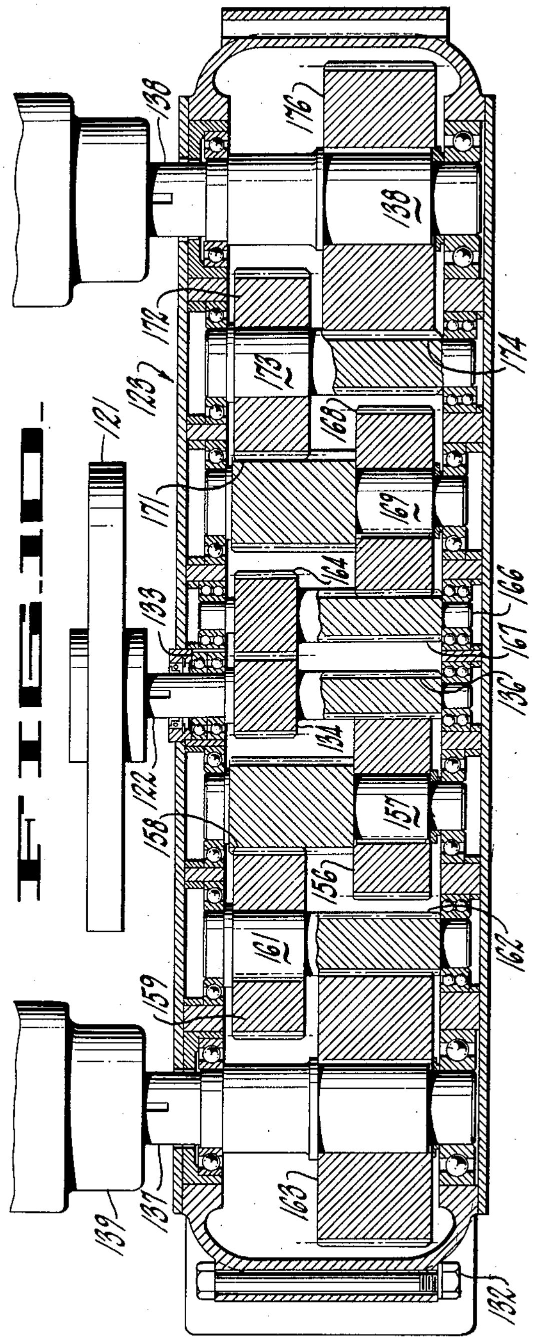
Figure 10 is a section through the drive mechanism shown in Figure 9.
Figure 9:
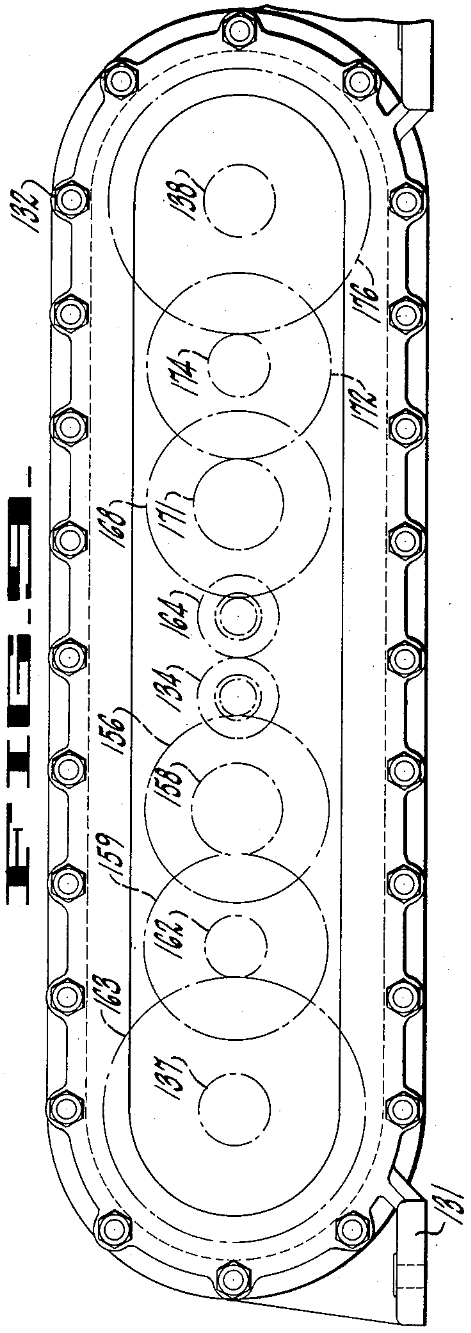
Figure 9 is a front elevation of a portion of the drive mechanism.

Referring particularly to Figures 9 and 10, each drive unit includes a suitable casing structure generally indicated at 131 and made up of several parts suitably secured together as by bolts 132. Power input shaft 122 in each drive unit 123 is mounted in suitable bearings 133 in the casing and includes spur gears 134 and 136 thereon through which power is transmitted to drive the power output shafts 137 and 138, the latter being connected by flexible couplings 193 to shafts 42*a* and 42*d* in two of the screw conveyor flights to be driven. In the unit shown, four screw conveyor flights are provided, shafts 42*a* and 42*d* being upon the outboard flights, the inboard flights including shafts 42*b* and 42*c*. These are driven in turn from shafts 42*a* and 42*d*, a sprocket 146 being provided upon the shaft 42*a* and driving sprocket 147 by a chain 148, sprocket 147 being provided upon the shaft 42*c*; similarly, shaft 42*d* includes a sprocket 149 driving a sprocket 151 on shaft 42*b* through chain 152. The chains 148 and 152 are shown in Figure 4, but are omitted in Figures 1 and 2.

The drive from gear 134 to shaft 137 includes gear 156 enmeshed with gear 136 on shaft 122, gear 156 being provided upon a shaft 157 which also includes a gear 158 driving a gear 159 upon a shaft 161; shaft 161 also carries a gear 162 driving gear 163 upon shaft 137. The several shafts are mounted in suitable bearings provided in the casing.

The drive for shaft 138 is through gear 164 provided upon a shaft 166, this shaft also carrying a gear 167 which in turn drives a gear 168 upon a shaft 169; shaft 169 also carries a gear 171 which drives a gear 172 upon a shaft 173; shaft 173 also includes a gear 174 driving a gear 176 upon shaft 138. Shafts 137 and 138 are driven in opposite directions, but at the same rotational speed. The several shafts are supported in suitable bearings.

*Fluid supply*

Figure 5:
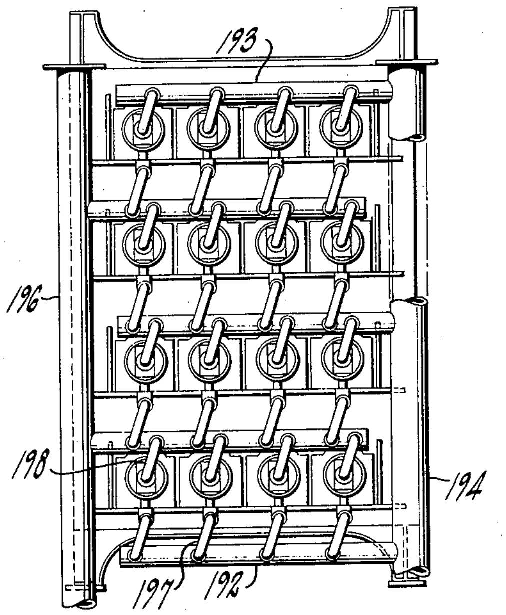
Figure 5 is a rear view of the device showing the connection of the various fluid conduits.

Referring particularly to Figure 5, each of the pipes 91 in a given flight is connected by conduits 197 to a common manifold 192. Similarly, each of the pipes 86 is connected by conduit 198 to a common manifold 193, the respective manifolds being in turn connected to fluid inlet pipe 194 and fluid outlet pipe 196.

Fluid flow through each of the casing units can be suited as desired to the flow of material therethrough by suitably connecting the inlets and outlets on the various units. Thus, suitable inlet manifold pipes and outlet manifold pipes can be connected as desired with the respective inlets and outlets for the various units whereby the desired flow is obtained through the several heat exchange casings 20. The showing of these connections has been omitted from the drawing for clarity in the illustration of more essential elements.

*Helix angle*

In handling many materials, it is extremely desirable that the material not be changed in particle size. For example, in the manufacture of crystal salt wherein the salt to be cooled is passed through the previously described units, it is desirable that the crystal size of the salt not be reduced materially. If the helix angle is such that the material is gently rolled over instead of being violently agitated to an extent whereat the material abrades itself, adequate heat inter-change is effected, substantially all of the particles at one time or another being in contact with the heat exchange surface and yet the crystal size is not altered. I have found that the ratio of rotation of the material with respect to the rotation of the screws should be less than 36 to 1. In other words, the screws are preferably designed with a very flat helix angle so that there is a minimum of lifting or impacting of the material upon itself in transit or with the heat exchange surfaces whereby it is reduced in particle size.

With the pitch of a single thread flight defined as the distance measured along an axis parallel to that of the flight between any two points on the flight periphery 360° apart, I have found that pitch should preferably not exceed half the diameter and preferably should not be less than 30% of the diameter. Good results are obtained with flights having a pitch within the limits of from about 0.5 to about 0.30 of the diameter; the flatness of the helix angle controls, for a material of a given viscosity, the retention time of such material in the unit. The lower limit on the pitch-diameter ratio is provided by the requirement that the convolutions on one flight must be spaced sufficiently to admit (1) of the convolutions of the interleafing flight, and (2) sufficient of the fluid material undergoing treatment. When the fluid material is quite fluid, as tomato juice, jelly or a hot thin lubricating oil, the flight pairs can be so close as to provide clearance between them with a thin material fluid layer or film in contact with the interleafed convolutions. In this case, the ratio will be determined largely by the thickness of each convolution. With more viscous fluids such as sand, greater clearance is required, and the ratio needs be larger.

*Flight spacing*

Referring particularly to Figure 3, it will be noted that four flights have been shown in each unit and that adjacent flight pairs rotate in opposite directions. Each adjacent flight pair is of opposite hand, e. g., a right-hand flight and a left-hand flight. As has been stated, it is necessary in any case that the flights be so supported with respect to one another that the outside edge of each flight extends over and falls within the rotational path of the immediately-next-adjacent flight. It is preferred that the peripheral edge of each flight be substantially in a wiping engagement with the tubular shaft of each adjacent flight; between these extremes it is desirable that the center-to-center spacing between any two adjacent flights be less than half the sum of the diameters of the two adjacent flights. This ensures the desired flow of material back and forth between the flights and against the casing whereby the desired heat exchange is effected. Thus, one is provided with two extremes, one wherein the edge of one flight is substantially in wiping engagement with the hollow tubular shaft of the immediately-next-adjacent flight and one wherein the rotational path of the wiping edge of one flight coincides with the rotational path of the wiping edge of the immediately-next-adjacent flight. The first condition is preferred inasmuch as this ensures the greater contact of the material with the heat exchange screws and with the casing and with less "dead" or unworked material within the casing.

While I have particularly described the invention as applied to a unit having four heat exchange screws therein, it is obvious that more or less than these can be provided. Thus, for example, referring to Figures 13–17, I have respectively shown units having two, three, four, five and six rotational screws therein, utilization of an even number of screws is preferred with viscous fluids such as sand because an odd number of screws will tend to pack such a fluid against one side of the unit casing. An odd number of screws can be used to advantage with materials which flow readily such as tomato juice, jellies, oils and the like.

*Application*

The units described can be applied to the heating or cooling of any fluid which will flow or be conveyed through the casing in contact with the heat exchange screws; it can also be utilized for carrying on the reaction of two or more materials; it can also be utilized for carrying on a heat exchange wherein some physical change takes place in the material such as occurs in crystallization, in removing wax from a lubricating oil, in sterilizing tomato juice and in cooking jams and jellies. The apparatus has been successfully applied to the cooling of salt, sand, cement, clinker, pressed oil-cake and to the heating of a wide variety of materials including various food stuffs; if desired, the screws can be provided of such a pitch that vigorous working and mixing occurs so that heterogeneous materials such as cotton fibers, asphalt and mineral filler, utilized in the manufacture of composition battery boxes, in accordance with the Lukens Patent, 1,752,917, can be simultaneously heated and mixed to provide a homogeneous mass suitable for molding. As a heat exchange fluid, one can use any of the known fluids such as steam, water, ammonia, dichlorodifluoromethane, diphenyl oxide, oil, etc. In its broadest application, the apparatus described can be applied to the heating and cooling of any material which will flow sufficiently to pass through the apparatus.

This application is a continuation-in-part of my prior application, Serial No. 330,397, filed January 9, 1953, which application was, in turn, a continuation-in-part of my prior application, Serial No. 157,290, both of which are now abandoned.

I claim:

1. In a heat exchange device comprising a trough-like casing having a material inlet adjacent one end thereof and a material outlet adjacent the other end thereof, at least one right-hand and at least one left-hand screw mounted in said casing, each screw including a tubular shaft having a first continuous, substantially flat face thereon extending at substantially 90° to the shaft and a second continuous face extending arcuately from adjacent the peripheral edge of the first continuous face to the tubular shaft and spaced from the first continuous face to provide a fluid conduit for circulation of a heat exchange medium between the flight faces, and means supporting said screws for rotation in opposite directions in said casing with one screw extending within the rotational path of the other screw a substantial distance.

2. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, the pitch of each hollow helical thread being from about 30% to about 50% of the diameter of said helix, and the thickness of said thread, measured at a point radially about halfway between the shaft and the periphery of the helix, being not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

3. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, at least one of said screws having a thread thereon including two substantially parallel faces at right angles to the shaft, said parallel faces being connected at their peripheral edge by a flat cross member substantially parallel to the shaft to provide a fluid conduit therebetween, the pitch of each hollow helical thread being from about 30% to about 50% of the diameter of said helix, and the thickness of said thread, measured at a point radially about halfway between the shaft and the periphery of the helix being not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

4. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, at least one of said screws having a flat continuous face extending at substantially 90° to the shaft and a second face extending arcuately from adjacent the peripheral edge of the continuous flat face to the shaft, the pitch of each hollow helical thread being from about 30% to about 50% of the diameter of said helix, and the thickness of said thread, measured at a point radially about halfway between the shaft and the periphery of the helix being not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

5. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, at least one of said screws having two arcuate faces extending from the shaft and joined together at the peripheral edge thereof to provide a fluid conduit therebetween, the pitch of each hollow helical thread being from about 30% to about 50% of the diameter of said helix, and the thickness of said thread, measured at a point radially about halfway between the shaft and the periphery of the helix being not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

6. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, each of said screws having a thread thereon including two substantially parallel faces at right angles to the shaft, said parallel faces being connected at their peripheral edges by a flat cross member substantially parallel to the shaft to provide a fluid conduit therebetween, the pitch of each hollow helical thread being from about 30% to about 50% of the diameter of said helix, and the thickness of said thread, measured at a point radially about halfway between the shaft and the periphery of the helix is not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

7. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, each of said screws having a flat continuous face extending at substantially 90° to the shaft and a second face extending arcuately from adjacent the peripheral edge of the continuous flat face to the shaft, the pitch of each hollow helical thread being from about 30% to about 50% of the diameter of said helix, and the thickness of said thread, measured at a point radially about halfway between the shaft and the periphery of the helix being not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

8. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, each of said screws having two arcuate faces extending from the shaft and joined together at the peripheral edges thereof to provide a fluid conduit therebetween, the pitch of each hollow helical thread being from about 30% to about 50% of the diameter of said helix, and the thickness of said thread, measured at a point radially about halfway between the shaft and the periphery of the helix is not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

9. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, one of said screws having a flight having a thread thereon including two substantially parallel faces at right angles to the shaft, said parallel faces being connected at their peripheral edges by a flat cross member substantially parallel to the shaft to provide a fluid conduit therebetween, the other screw having two arcuate faces extending from the shaft and joined together at their peripheral edges to provide a fluid conduit therebetween, the pitch of each hollow helical thread being from about 30% to about 50% of the diameter of said helix, and the thickness of said thread, measured at a point radially about halfway between the shaft and the periphery of the helix being not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

10. A heat exchange device for altering uniformly the heat content of a fluid material containing finely divided solid particles, said device comprising a trough-like casing having a material inlet adjacent one end thereof and a material outlet adjacent the other end thereof, at least one right and at least one left-hand screw mounted in said casing, said screws being interfolded with one screw extending within the rotational path of the other screw, each screw including a shaft having a hollow helical thread thereon having a leading face and a trailing face each extending outwardly from said shaft and mutually cooperating to form a closed fluid conduit, the trailing face on one screw cooperating with the leading face of the other screw to provide during rotation of the screws a space of variable volume in relation to the trough and to effect positive re-location of solid particles in the fluid in contact with said faces upon rotation of said screws, one of said screws having a flat continuous face extending at substantially 90° to the shaft and a second face extending arcuately from adjacent the peripheral edge of the continuous flat face to the tubular shaft, said faces being spaced to provide a fluid conduit therebetween, the other screw having two arcuate faces extending from the shaft and joined together at the peripheral edges thereof to provide a fluid conduit therebetween, the pitch of each hollow helical thread being from about 30% to about 50% of the diameter of said helix, and the thickness of said thread, measured at a point radially about halfway between the shaft and the periphery of the helix being not less than 25% of the distance measured substantially parallel to the axes of the screws and between a first plane and a second plane passed respectively through different interfolded screws, each plane being passed through a shaft normal thereto and through the hollow helical thread on said shaft at a point midway of said thread along said shaft, said trough fitting closely adjacent to the rotational path of said flights, means for circulating a heat exchange fluid through each hollow thread, and means for supporting said screws for rotation in opposite directions in said casing with one screw extending within the rotational path of the other screw.

References Cited in the file of this patent

UNITED STATES PATENTS

| | | |
|---|---|---|
| 375,165 | Krutzsch | Dec. 20, 1887 |
| 409,409 | Longer | Aug. 20, 1889 |
| 1,987,952 | Wilson | Jan. 15, 1935 |
| 2,148,205 | Kiesspalt | Feb. 21, 1939 |
| 2,231,357 | Burghauser et al. | Feb. 11, 1941 |
| 2,313,705 | Jack | Mar. 9, 1943 |
| 2,321,185 | Christian | June 8, 1943 |
| 2,434,707 | Marshall | Jan. 20, 1948 |
| 2,610,033 | Rietz | Sept. 9, 1952 |

FOREIGN PATENTS

| | | |
|---|---|---|
| 156,821 | Germany | Dec. 2, 1904 |
| 438,007 | Germany | Dec. 2, 1926 |